United States Patent
Hansen et al.

(10) Patent No.: US 9,933,329 B2
(45) Date of Patent: Apr. 3, 2018

(54) MULTI-SENSOR INSPECTION FOR IDENTIFICATION OF PRESSURIZED PIPE DEFECTS THAT LEAK

(71) Applicant: Electro Scan, Inc., Sacramento, CA (US)

(72) Inventors: Charles A. Hansen, Carmichael, CA (US); Mark Grabowski, Pewaukee, WI (US)

(73) Assignee: Electro Scan, Inc., Sacramento, CA (US)

( * ) Notice: Subject to any disclaimer, the term of this patent is extended or adjusted under 35 U.S.C. 154(b) by 103 days.

(21) Appl. No.: 14/866,354

(22) Filed: Sep. 25, 2015

(65) Prior Publication Data

US 2017/0045416 A1 Feb. 16, 2017

Related U.S. Application Data

(60) Provisional application No. 62/203,809, filed on Aug. 11, 2015.

(51) Int. Cl.
*G01M 3/00* (2006.01)
*G01M 3/18* (2006.01)
(Continued)

(52) U.S. Cl.
CPC ............... *G01M 3/40* (2013.01); *G01M 3/18* (2013.01); *G01M 3/246* (2013.01);
(Continued)

(58) Field of Classification Search
CPC ............ G01M 3/00; G01M 3/18; G01M 3/24; G01M 3/246; G01M 3/26; G01M 3/28;
(Continued)

(56) References Cited

U.S. PATENT DOCUMENTS 4,101,827 A * 7/1978 Offner ................... G01M 3/18
324/559
4,651,558 A * 3/1987 Martin ..................... E03F 7/12
348/84
(Continued)

FOREIGN PATENT DOCUMENTS

DE 4010622 A1 * 10/1991 .............. G01M 3/18
DE 4219434 A1 * 12/1993 .............. G01M 3/18
(Continued)

OTHER PUBLICATIONS

Mary Ellen Tuccillo, Ph.D. et al; Report on Condition Assessment Technology of Wastewater Collection Systems; Office of Research and Development National Risk Management Research Laboratory—Water Supply and Water Resources Division; www.epa.gov; Aug. 2010.

*Primary Examiner* — Nguyen Ha
(74) *Attorney, Agent, or Firm* — Heisler & Associate (57) ABSTRACT

The system utilizes conductivity equipment as well as a camera, pressure sensor, and acoustic hydrophone within a probe deployed via cable into a pipe to be inspected. The probe completes an electric circuit back to ground when the probe is adjacent a defect through which electric currents can pass, thus producing varying electric current. The camera, incorporated into the electric probe, is utilized for both inspection and navigation through the pipe by providing a close-circuit video data feed. The pressure sensor detects alterations in the pressure and flow field of the fluidic region in the area of a leak. The acoustic hydrophone listens for the sound leaks in a pressurized pipeline. The inspection device is tethered to a cable and inserted a measured distance into the pipeline, typically with the pipeline under pressure, via a launch tube. Multi-sensor data versus pipeline position is thus obtained.

20 Claims, 7 Drawing Sheets

(51) Int. Cl.
*G01M 3/24* (2006.01)
*G01M 3/26* (2006.01)
*G01M 3/28* (2006.01)
*G01M 3/38* (2006.01)
*G01M 3/40* (2006.01)
*G01M 5/00* (2006.01)

(52) U.S. Cl.
CPC ............ *G01M 3/2823* (2013.01); *G01M 3/38* (2013.01); *G01M 5/0025* (2013.01); *G01M 5/0083* (2013.01)

(58) Field of Classification Search
CPC ........ G01M 3/2823; G01M 3/38; G01M 3/40; G01M 5/0025; G01M 5/0083
See application file for complete search history.

(56) References Cited

U.S. PATENT DOCUMENTS

| | | | |
|---|---|---|---|
| 4,974,168 A | 11/1990 | Marx | |
| 5,892,163 A | 4/1999 | Johnson | |
| 6,301,954 B1 * | 10/2001 | Schuberth | G01M 3/18 324/358 |
| 6,545,704 B1 | 4/2003 | Olsson | |
| 6,820,653 B1 | 11/2004 | Schempf | |
| 7,536,944 B2 * | 5/2009 | Yoh | F15B 15/1423 92/26 |
| 2004/0130332 A1 * | 7/2004 | Harris | G01M 3/18 324/558 |
| 2005/0005716 A1 * | 1/2005 | Harris | G01M 3/005 73/865.8 |
| 2005/0062479 A1 * | 3/2005 | Fink | G01M 3/40 324/444 |
| 2006/0091876 A1 * | 5/2006 | Davila | G01M 3/40 324/71.1 |
| 2010/0064776 A1 * | 3/2010 | Getto | G01F 1/7088 73/40.5 R |
| 2013/0003501 A1 * | 1/2013 | Marquez | G01M 3/18 367/83 |
| 2013/0199272 A1 * | 8/2013 | Khalifa | G01M 3/005 73/40.5 A |
| 2014/0154991 A1 * | 6/2014 | Brown | G01M 3/00 455/42 |

FOREIGN PATENT DOCUMENTS

| | | |
|---|---|---|
| DE | 19612800 A1 | 10/1997 |
| GB | 2492460 A | 1/2013 |

* cited by examiner

MULTI-SENSOR INSPECTION FOR IDENTIFICATION OF PRESSURIZED PIPE DEFECTS THAT LEAK

CROSS-REFERENCE TO RELATED APPLICATIONS

This application claims benefit under Title 35, United States Code § 119(e) of U.S. Provisional Application No. 62/203,809 filed on Aug. 11, 2015.

FIELD OF THE INVENTION

The following invention relates to systems and methods for detecting defects in underground fluid transporting pipes, such as water pipes, which have a potential to leak. More particularly, this invention relates to methods which can utilize a combination of camera, acoustic hydrophone, water pressure sensor, and electric probe through a common defect detection signal cable.

BACKGROUND OF THE INVENTION

Pressurized water delivery pipeline systems and other underground pressurized and unpressurized fluid transport pipes can be difficult to inspect due to their hidden location and the substantial costs related with ground excavation. Leaks in such pipes can increase costs associated with operating the pipe due to disruptions and damages, create potential hazards, and increase public health risks. Additionally water (and often other pipeline fluids) is an important natural resource and water pipelines are crucial in the continuation of our daily lives. Thus, it is beneficial to identify defects in the pipe accurately and quickly, while avoiding disruption to the community's water network services.

Pressurized pipes can be difficult to inspect due to accessibility being limited, difficult, and sometimes dangerous. Therefore, inspection of pressurized pipes with the utilization of a single inspection device is generally beneficial.

One form of defect detection is described in detail in ASTM Standard F2550-13 which describes a low voltage conductivity method for defect detection by measuring variations in electric current flow through walls of the pipe as part of a series circuit including a voltage source and an electric current sensor, which collects data as the probe moves through a known position within the pipe.

One such probe beneficial for use in conducting this low voltage conductivity is provided by Electro Scan, Inc. of Sacramento, Calif. Such probes effectively concentrate the electric current over a relatively short length of the pipe in which the probe is located, so that electric current intensity data gathered by the low voltage conductivity method can be accurately correlated with the condition of the pipe directly adjacent the probe. Additionally, if a water main is lined with a cured-in-place method, low voltage conductivity is able to identify defects that typically go unnoticed by other methods such as cameras and acoustic hydrophones.

However, the low voltage conductivity method is unable to accurately detect leaks in metallic pipes since those pipes conduct electricity, resulting in no significant difference in electric current intensity between the pipe wall and a defect. As a result, when there are sections of metallic pipe within a pressurized system, it may result in data readings which are difficult to decipher.

Another form of defect detection is acoustic hydrophones, which locate defects by listening for the leak noise(s) that travels through the water and pipe walls and records the data. Hydrophones work well in metallic and concrete pipes, but in plastic and asbestos cement pipes the sound does not carry well enough to give an accurate reading. This is due to the sounds resulting from a leak being reduced by the walls of the pipe, which can make them difficult to detect, especially if a hydrophone is too far from a defective wall. Additionally, hydrophones can have the possibility of missing leaks, thereby placing anomalies in the data due to sound interference from occurrences such as surface noise as well as acoustic damping because of the surrounding soil.

A third form of leak detection in pressurized pipes is by utilizing cameras, such as closed-circuit television (CCTV). Cameras aid in the identification of structural defects and air pockets, mapping of service tap and valve locations, investigation of water quality, and so on. However, the identification of defects which leak can be very difficult and easily missed since the camera cannot always see where water is exfiltrating and many defects may be too small or too difficult to locate visually. Asbestos cement pipes or pipes which have been lined using a cured-in-place process further exacerbate these issues. Additionally, minerals that commonly deposit on the walls of the pipe may obstruct the view of a leaking defect.

A fourth form of leak detection in pressurized pipes is by using pressure sensors. Since water pipelines are pressurized, leakage in a pipeline can alter the pressure and flow field of the working medium. Therefore, a fluidic region in the neighborhood of a leak will be created from the rapid change in static pressure, i.e. dropping from high-pressure inside the pipeline to low pressure in the surrounding medium resting outside. This pressure gradient can appear in pressurized pipes in the vicinity of leaks and openings. However, as the pressure in the pipe increases, the smaller leaks become exceedingly difficult to detect.

Each of the aforementioned technologies used in leak detection of pipes have different strengths and weaknesses and thus leave the possibility of falsely identifying leaks and/or completely failing to identify a leak. Hence, it is beneficial to utilize a system which incorporates multiple (or all) of these technologies. Doing so allows for the collection of a wider range of data and information regarding the pipe during a single inspection which not only limits the amount of entrances into the pipe to inspect, but also aids in eliminating false positives, thereby more accurately and safely determining the condition of the pipe.

SUMMARY OF THE INVENTION

Instead of relying solely on a single method such as visual inspection, pressure gradients, hydrophone readouts, or low voltage conductivity data, with this invention a system and method are provided for holistically inspecting pressurized pipes (and unpressurized pipes) for defects by utilizing several inspection methods within a single multi-sensory inspection tool (probe). By integrating multiple inspection methods into a single device, a larger data field can be provided in order to more accurately identify defects and their severity in a plethora of pipe materials.

With this invention a system and method are provided for operating a multi-sensor probe pipe defect detection tool with equipment and methods to enhance the results achieved thereby. The system in a preferred embodiment incorporating multiple leak detection technologies, includes a low-voltage electric current measurement probe, pressure sensor, camera, and acoustic hydrophone encased in a tightly toleranced vessel, capable of withstanding external pressures up to 100 psi (6.9 bar). The vessel can be made of many durable materials including lightweight plastic. It will typically have three metal rings encasing it, which create the two guard electrodes and one defect-reading electrode for the low voltage conductivity system.

The probe enters the pipe via a valve or a fire hydrant. This entrance into the pipe is performed by utilizing a specialized and adaptable "launch tube" in order to maintain operational flows and pressure within the pressurized water pipe while continually moving the cable in and out of the pipe throughout the inspection. The launch tube attaches to the hydrant or valve and is comprised of a venting and sealing arrangement wherein one side is at the same pressure as the pipe while the other side is at the lower atmospheric pressure. Both sides contain a bore leading to an internal chamber, while a vent valve vents said internal chamber to the outside and seals around the cable help prevent fluid loss. The multi-sensor probe and cable are able to pass through the bores, internal chamber, and seals in order to enter the pipe.

The launch tube is connected to the hydrant through use of a coupling device. When the coupling is fitted, the area between the bore and internal chamber provides a pressure drop. Water can be allowed to leak at a low pressure and flow rate from a bleeder valve within the venting arrangement while the inspection is performed. This particular venting arrangement works to reduce pressure and can eliminate excess pressure on the seals of the launch tube mechanism while the cable is being fed through these seals. Under certain circumstances, it can also eliminate the need for seals altogether.

The coupling device is also connected to a motor and roller arrangement within a housing to drive the cable. This driving component is coupled to the launch tube and moves the cable through the sealing system on the launch tube via a motorized rotating wheel (pulley). The cable is held to the motorized drive wheel with the use of multiple adjustable tensioner wheels (pulleys). The drive motor is controlled with a wired or wireless remote by the operator.

The probe is transported through the pipe using the pipe's internal fluid velocity. A rear-facing parachute-type device, known as a "velocity chute" located on the back end of the probe propels the probe forward through the pipe. Necessary velocity is often obtained by manipulating valves or hydrants further down throughout the piping system.

The camera is located on the front end of the multi-sensor probe in order to transmit video images of the interior of the pipe through a modified ethernet or fiber optic cable to an on-site PC-based processor where it can be used to aid in navigation of the pressurized pipe as well as visually locate defects and structural issues within the pipe. The camera preferably has a sapphire lens which is able to withstand the high pressures experienced in pressurized pipelines. An internal electronic gyroscope with 3-axis accelerometers is located within the probe body. The data from the gyroscope is used to stabilize the video image and create more accurate measurements and locations, as free-swimming probes may "wander" and twist through the diameter of the pipe. To illuminate the dark conditions, a high-intensity LED light ring is located in the diameter around the camera lens. In addition, the camera module's firmware can adjust for lux sensitivity, backlight compensation, and white balance to assist in creating a clearer video image in the darker conditions.

The acoustic hydrophone is located in the back end of the multi-sensor probe. The hydrophone locates defects by listening for the acoustic vibrations with a frequency in the range between about 10 Hz to 170,000 Hz. This leak noise travels through the water and pipe walls and is detected by the hydrophone. The acoustical signals are converted to digital data which can then be transmitted through the same modified ethernet or fiber optic cable to an on-site PC-based processor for recording and interpretation.

The pressure sensor is preferably located in the front end of the multi-sensor probe, adjacent to the camera lens. The pressure sensor records and utilizes the pressure gradients that occur in the vicinity of leaks and openings throughout the pressurized pipes to locate defects. By determining the fluidic regions, the general location of leaks can be determined, since the fluidic regions will be created from the rapid change in static pressure due to leakage in the pipeline which can alter the pressure and flow field of the working medium. Additionally, by measuring and recording the pipe's internal pressure, a calculation can be performed incorporating some of the low voltage conductivity measurement data to produce an estimate leakage rate for each defect and subsequently, the pipe as a whole (in gallons per minute (GPM) or liters per second (LPS)). The pressure sensor data is then typically digitally transmitted through the same modified ethernet or fiber optic cable to an on-site PC-based processor.

The system also includes an electric probe coupled to a distal end of an electrically conductive cable also having a proximal end opposite the distal end. The probe is preferably of a type similar to that disclosed in U.S. Pat. No. 6,301,954, incorporated herein by reference in its entirety. A voltage source is provided adjacent to the proximal end of the electrically conductive cable, typically in the form of DC current.

An electric meter, typically in the form of a current meter constructed into the circuitry and firmware of the probe signal evaluation controller, is also located along the electrically conductive modified ethernet or fiber optic cable, typically near the proximal end thereof. A ground interface, typically in the form of a ground stake, is penetrated into the ground in the general area of the pipe to be inspected and has a ground wire which extends to the proximal end of the probe signal evaluation controller, which is typically located above ground and mounted within a movable case or vehicle. Thus, a series electric circuit is created which is closed by passage of electric current from the probe through a defect in the pipe wall and through ground between this defect and the ground interface. Intensity of this current in this circuit is measured by the electric meter. If the electrical current in this grounding circuit it too strong due to environmental conditions such as high-salt content or large electrical grounding plane, a potentiometer can be installed in the circuit to add resistance to the circuit and reduce errant electrical signal noise.

Probe position data is also gathered so that the probe position data is correlated with the various sensor data to create an unconditioned multi-dimensional data set of current intensity, camera footage, pressure gradients, and hydrophone readings versus probe position, where the probe position is the distance from the chosen start or "zero" point.

A cable reel, often mounted in a vehicle due to its size and weight, is utilized to assist in storing portions of the electrically conductive modified ethernet or fiber optic cable which is not yet drawn down into the pipe. While one end of the cable is connected to the probe and payed out into the pipe, the other end of the cable is routed through the center drum of the reel, and attached to a specialized slip ring, which allows the reel to turn limitless times, while still delivering the data packets out of the reel enclosure and to the on-site PC-based processor. The cable is routed through a cable distance sensor which is fixed to the downrigger frame of this cable reel and measures an amount of cable payed off of the reel and into the pipe extending toward the probe and subsequently, the amount of cable payed back onto the reel. This cable distance sensor is correlated with probe position so that the position of the probe is known for the multi-sensor data. The cable is also sterilized before entering the pipe, either by utilizing the governing agency's recommended chemical sterilization method, or with ultraviolet (UV) rays from a specialized UV light box.

As the multi-sensor inspection probe is drawn through the pipe being evaluated, the cable pays off of the reel and passes through the cable position sensor. Data (including one or more of: electric current data, hydrophone data, pressure gradient data, and camera data) are simultaneously gathered. The cable position sensor and leak detection sensors preferably each include transmitters which transmit via long-range ethernet or fiber optic cable to a separate on-site probe signal evaluation controller, which include power sources, long-range Ethernet or fiber optic receivers, internal current meters, and circuitry for the packetizing of the data. This on-site processor correlates the different signals into a single multi-dimensional data set of sensor readings versus probe position. The probe signal evaluation controller relays all data via serial or USB cable to the on-site PC for recording, viewing, and processing (including applying the SMPTE 12M timecode to the video feed).

Data from the inspection probe and the cable distance sensor is automatically transmitted to the probe signal evaluation controller which can then readily gather an unconditioned data set. This data set can be viewed on site and can trigger alarms when preset limits associated with defects of a preselected magnitude are identified. This unconditioned data set can be viewed through the on-site processor, such as a PC. The unconditioned data can also be transmitted, such as by cellular data link, to a remote location for archiving and conditioning of the data into more meaningful data which can be transmitted back to the on-site processor for display to personnel in the field in near real time. The conditioned data can be incorporated into a larger overall data set for an overall pressurized (or unpressurized) piping system, of which the evaluated pipe is only a portion.

OBJECTS OF THE INVENTION

Accordingly, a primary object of the present invention is to provide a system for efficiently and accurately gathering data associated with underground pipe conditions utilizing a multi-sensor inspection probe.

Another object of the present invention is to provide a method and apparatus for gathering, displaying, conditioning and archiving multi-sensor data on pressurized pipe conditions for maximum usefulness, the data including electric resistance data, camera data, pressure data and acoustic data.

Another object of the present invention is to provide a system and apparatus for evaluating pipe sections in underground locations, such as pressurized (or unpressurized) gas, water or other fluid pipes, for defects in the pipe which have the potential to leak.

Another object of the present invention is to minimize leakage of fluids into or out of pipelines by providing an effective method and apparatus for evaluating underground pipe condition.

Another object of the present invention is to provide a system and apparatus for managing cable associated with a multi-sensor underground pipe evaluation system for convenient and easy operation and to acquire highly precise data.

Another object of the present invention is to provide a power and data communication system for the inspection of internal pipelines that operates via long-range ethernet (in excess of 300 meters) cable.

Another object of the present invention is to provide a system and method for collection, analysis and archiving of pressurized pipe defect data which includes both unconditioned data and conditioned data.

Other further objects of the present invention will become apparent from a careful reading of the included drawing figures, the claims and detailed description of the invention.

DETAILED DESCRIPTION OF THE PREFERRED EMBODIMENT

Referring to the drawings, wherein like reference numerals represent like parts throughout the various drawing figures. The system 1 is consistent with a prior art system described in ASTM (ASTM International, formerly known as "American Society for Testing and Materials") Standard F2550-13 described as "Standard Practice for Locating Leaks in Sewer Pipes By Measuring The Variation of Electric Current Flow Through the Pipe Wall." This system 1 can be utilized in underground pressurized (or unpressurized) pipes P such as water or sewer by passing a probe 10 through the pipe P, such as between adjacent fire hydrants H, valves, or other appurtenances to detect defects in the pipe P wall. The system 1 incorporates a launch tube assembly, a reel assembly, and data handling and typically also processing with an on-site PC-based processor, as well as a remote processing location, for efficient and accurate data handling and overall database construction of pipe condition data.

More specifically, and with particular reference to FIGS. 1-3 and 5 basic details of the multi-sensor probe 10 are described, according to this exemplary embodiment. The multi-sensor probe 10 is preferably elongate in form and is configured to be attached at the rear end 14. The rear end 14 of the probe 10 is configured to be attached to a main cable 15 with a water-tight electric connection maintained there through. The multi-sensor probe 10 is moved through the pressurized pipe P by the water therein and is additionally aided by use of a velocity chute 16 attached to the rear end 14 of the probe 10.

The velocity chute 16 is typically made from a flexible, supple material, and provided in conical or semi-spherical shape, which allows it to be able to capture the pipe's internal fluid velocity in order to propel the multi-sensor probe 10. The velocity chute 16 can be held open by multiple spring sections and is sized according to internal pipe diameter. The chute's flexibility allows it to be manipulated through many of the physical constraints of the pipe P. The velocity chute 16 also helps center the probe 10 in the pipe P, as the fastest velocity of a pipeline is typically near the center, away from the pipe P walls. A centering cone 18 (FIG. 5) can also be provided at a front end 12 of the probe 10 if desired.

With reference to FIGS. 1-5, basic details of the multi-sensor probe 10 pipe defect evaluation system 1 are described, according to an exemplary embodiment. The multi-sensor probe 10 incorporates a basic low voltage conductivity leak detection subsystem 20 which causes a series electric circuit to be formed extending along the cable 15 which extends from a probe end of the cable to a proximal end of the cable. The probe end has an electric probe attached thereto, such as through a connector. This probe can be similar to or the same as a probe such as that described in U.S. Pat. No. 6,301,954, incorporated herein in its entirety. Generally, such a probe has sensor electrode located between two "guard" electrodes which assist in shielding the sensor electrode and providing useful conductivity data.

The proximal end of the cable 15 is coupled to a ground stake 24 (FIGS. 4 and 12) or already-established grounding source. A voltage source 26 is provided along the cable 15. An electric meter 28, such as in the form of a current meter, is also located along the cable or between the voltage source 26 and the ground stake 24 to measure current within this series circuit. Such location of the voltage source 26 and/or the electric meter 28 can involve physical connection or non-physical, such as involving inductance or electromagnetic field forces. A final portion of the series circuit is in the form of a current path passing from the ground stake 24, through the ground, through a defect in the pipe P wall, and through electrically conductive fluid (typically water) contained within the pipe P and then to the electrode 22 of probe 10.

The current meter or other electric meter 28 detects a small amount of current when the pipe wall is free of defects, because the pipe wall is typically formed of a low or non-electrically conductive material, such as cement pipe, clay pipe, plastic pipe, etc. When there is a defect in the pipe, and because the pipe is filled with electrically conductive fluid, fluid will pass through this crack or other defect in the flooded pipe, and a current pathway is thus provided to enhance an amount of current detected by the current meter or other electric meter 28. A size of current spike in the conductivity subsystem 20 data (FIGS. 7 and 8) generally correlates with an amount or size of this defect.

Figure 7:
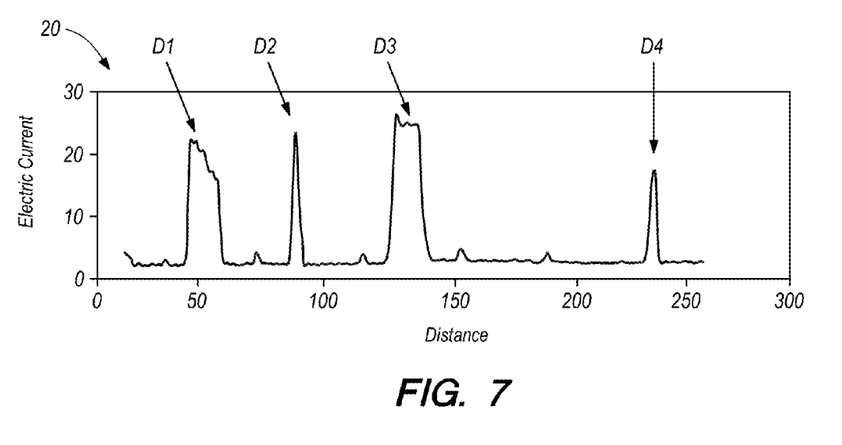
FIGS. 7 and 8 are graphic depictions of a typical graph of current intensity versus probe location as it might appear utilizing the low voltage conductivity method with current intensity spikes correlating with leaks and illustrating how current spikes indicate defects in the pipe with a propensity for leaking. Show are the Unprocessed Electro Scan Defect Current, Total Electro Scan Defect Current, and Post-Processed Electro Scan Defect Current readings versus distance.
Figure 8:
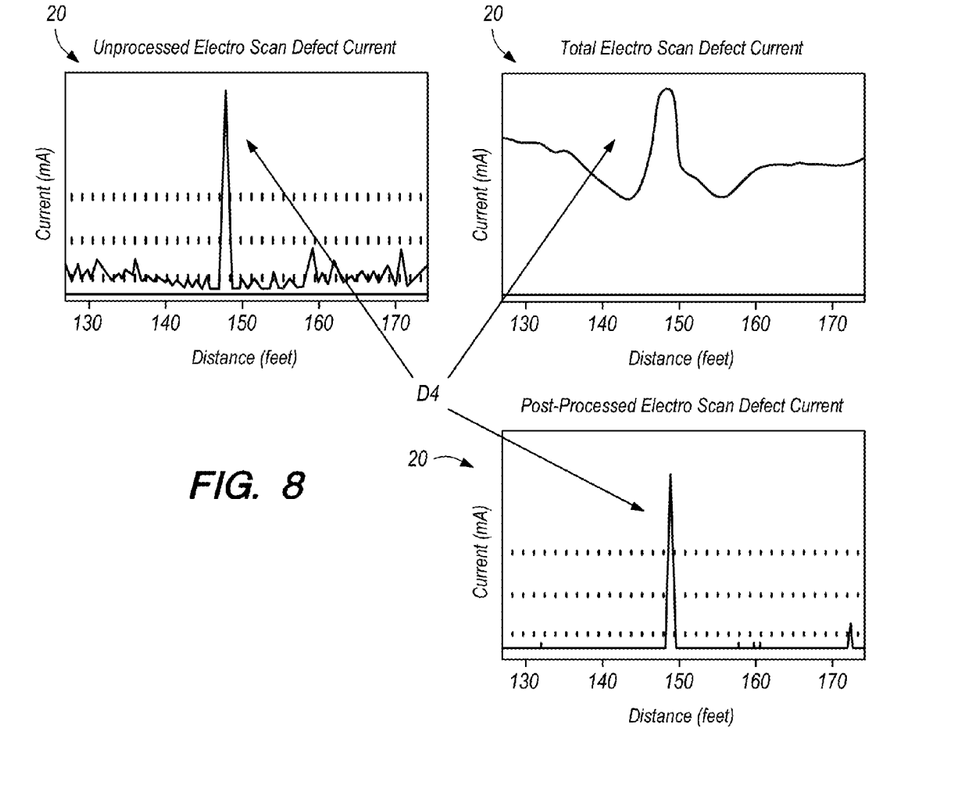

With reference to FIGS. 7 and 8, examples of different types of defects are indicated by different sizes and intensities of electric current spikes in the data plot/graph of current versus probe position ("distance"). For instance, a longitudinal crack such as defect $D_1$ results in a relatively wide current intensity spike which is spaced away from the location of any laterals or joints between pipe segments. Small and regularly located increases in electric current intensity are indicative of pipe joint locations which under normal circumstances might still allow sufficient fluid to pass there through to create a small spike in current. Graphs such as those in FIGS. 7 and 8 can be two-dimensional with current data on the Y-axis and distance on the X-axis, or otherwise plotted two-dimensionally. Alternatively, data from other sensors (e.g. FIGS. 9-11) can be plotted together with conductivity on the same graph for a three-dimensional (or four or five-dimensional) graph. A screen can also be split to simultaneously display separate graphs (and/or images).

Point or radial defects such as depicted by $D_2$ tend to provide a narrower spike in current intensity. Defects adjacent a lateral in the sewer are depicted by defect $D_3$ and generally appear in the graphed data as a wide current intensity spike which is aligned with a location of the lateral. Locations of lateral service taps (typically made of a metal, such as brass) appear in the graphed data as a sharp spike. Finally, defects which are aligned with joint locations in the pipe are indicative of a defective joint such as defect $D_4$.

The conductivity subsystem 20 and other parts of the multi-probe detection system 1 which are spaced from the probe 10 preferably are operated from a vehicle 60. At the vehicle 60, or other subpart location, the conductivity subsystem 20 includes interconnection of the on-site probe signal evaluation controller 80 (such as a personal computer) to a reel 70, such as through slip rings, to provide power (via power-over-ethernet or standard copper) to the multi-sensor probe 10 and also to provide real-time data to and from all the sensors on the probe 10 (including live 1080p video stream from the camera 32, as described below). Control signals and power are transferred through the cable up to 40,000 times per second, along with typical signals from all the other sensors (hydrophone, low voltage conductivity, camera and pressure) via long-range Ethernet or fiber optic cable 15. This 64-byte data packet is transmitted to an on-site probe signal evaluation controller 80, typically including a PC-based processor and associated monitor so that the readings associated with the signal transmitted along the cable 15 can be viewed by an operator.

The cable 15 can either use the Ethernet or other electronically conductive data transmission circuit to complete the conductivity circuit of the conductivity subsystem 20, or a separate ground wire can be provided for this purpose, separate from the data transmission circuit provided by the Ethernet or fiberoptic line. The on-site probe signal evaluation controller 80 and PC-based processor or other equipment read the packet of data sent from the probe 10, and process and display each subsystem sensors' respective reading separately.

Figure 9:
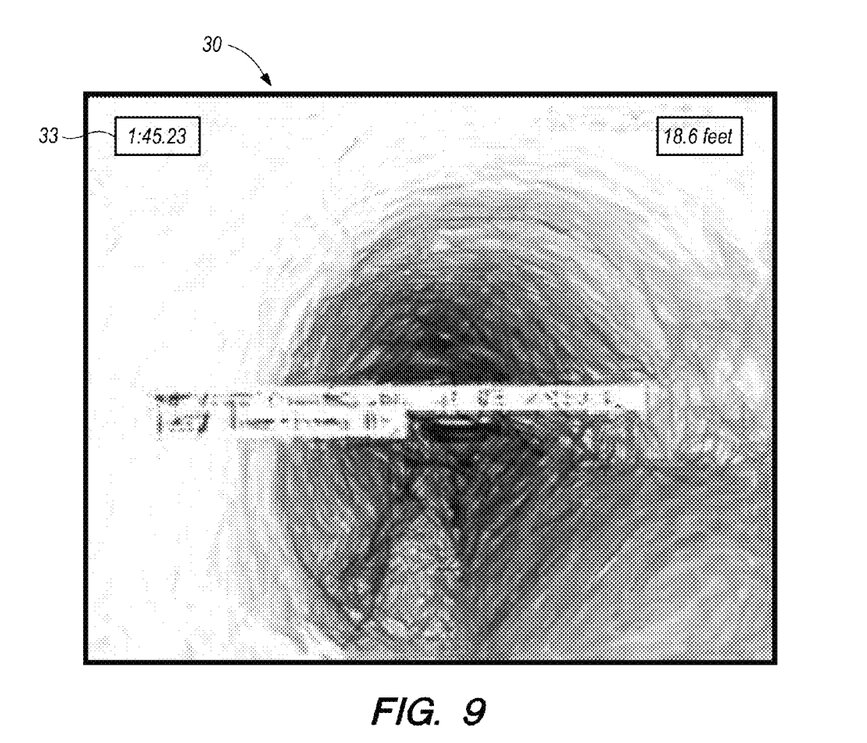
FIG. 9 is a graphic depiction of a typical camera reading versus probe location (distance) with SMPTE Timecode applied and distance encoding also shown.
Figure 10:
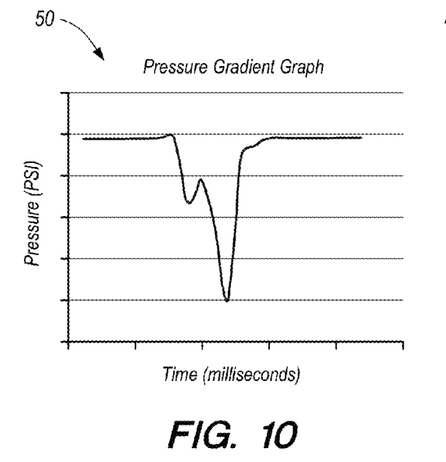
FIG. 10 is a graphic depiction of a typical water pressure sensor reading versus time.

With continuing reference to FIGS. 1-5 as well as FIG. 9, details of the camera subsystem 30 are described according to one embodiment. The camera subsystem 30 provide one form of additional data generating sensor (along with the acoustic hydroplane subsystem 40 and pressure subsystem 50) to complement the conductivity subsystem 20. The on-site probe signal evaluation controller 80 and PC-based processor can also facilitate storage for archiving of the live-camera image data, as well as applying the industry-recognized Society of Motion Picture and Television Engineers (SMTPE) timecode (or other time code). From the on-site PC-based processor, images from a camera 32 in the front end 12 of the probe 10 can be analyzed, adjusted, rotated, archived and otherwise beneficially used or transmitted to another data analysis tool for this same purpose.

This adjustment that is performed on the image can be done in real-time with the aid of software and data provided by the probe's internal electronic gyroscope 36 with three-axis accelerometer. The gyroscope's data feed helps the PC-based processor understand what position (pitch, yaw, rotate) the probe 10 is within the pipe P, and can help adjust the camera's image automatically. The operator has the ability to zoom, rotate, and otherwise adjust the image in post-processing. Additionally, the digital feed allows for uploading to a remote (cloud) location for almost-live viewing by others with an internet connection that is not on-site.

To obtain the image within the completely dark pipe P, a light from low-voltage light emitting diodes (LEDs) is utilized. The LEDs are positioned in a ring 34 around the camera lens in the front of the probe. The LEDs stay behind a glass 35 or plastic waterproof enclosure and dissipate any heat generated through the probe's body and into the surround fluid.

Camera data in the form of images can be displayed in a manner correlated with pipe P location. For instance, the video time stamp can be correlated with a clock associated with the cable 15 position/distance sensor 72 (described in detail below) so that video time can be correlated to pipe P position of the camera 32. The video can be shown on a split screen adjacent to conductivity data graphs (e.g. FIG. 7), such as with a mark on the graph indicating the exact camera 32 position correlating with the image. As another option, the image can be displayed upon the graph small enough to not obscure the conductivity (or other sensor) data and with the image located at the distance point of the graph matching camera position for the image.

Figure 11:
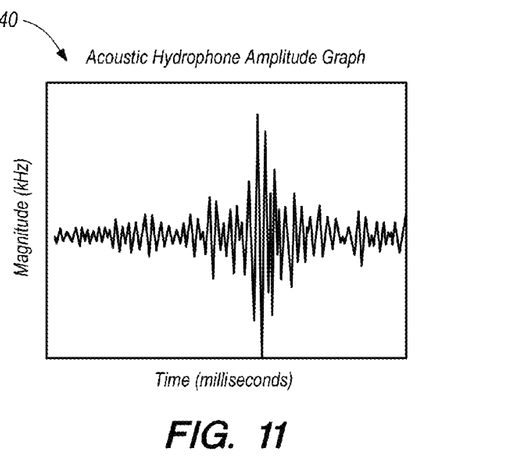
FIG. 11 is a graphic depiction of a typical acoustic hydrophone reading versus time.

With continuing reference to FIGS. 1-5 as well as FIG. 11, details of the acoustic subsystem 40 are described, according to one embodiment. The vehicle 60 interconnection to the reel 70 in the same manner previously stated allows for delivery of an acoustic hydrophone 42 reading back from the multi-sensor probe 10 through the cable 15. The acoustic hydrophone 42 would typically be located in the rear end 14 of the multi-sensor probe 10. If there is a leak in a pipe P under pressure, the force of the fluid being expelled from the pipe P creates a distinct acoustic reverberation within the fluid and the pipe walls. Even unpressurized pipes P may also have an acoustic noise that can be detected. Leak noises that travel through the water and pipe walls are detected by the hydrophone 42 which listens for these specific acoustic vibrations. These acoustic signals are then converted to digital data packets which are then transmitted through the cable 15 up to 40,000 times per second, along with signals from all the other sensors (camera, low voltage conductivity, and pressure) via long-range Ethernet or fiber optic. This 64-byte data packet is transmitted to the on-site probe signal evaluation controller 80 and PC-based processor and associated monitor so that the readings associated with the signal transmitted along the cable 15 can be viewed by an operator.

The on-site probe 10 signal evaluation controller 80 and PC-based processor or other equipment read the packet of data sent from the probe 10, and process & display each sensors' respective reading separately.

The on-site probe signal evaluation controller 80 and PC-based processor can also facilitate storage for archiving of the hydrophone 42 data. The data from the acoustic hydrophone 42 is in the form of bipolar sensor amplitude over time, and is graphically displayed on the PC's screen as such. From the on-site PC-based processor, the data can be analyzed, conditioned, archived and otherwise beneficially used or transmitted to another data analysis tool for this same purpose. The operator has the ability to select particular frequency ranges to accept (which is often determined by variables such as pipe material) and the ability to ignore particular frequency ranges (background noise, fluid meter ticks, etc.).

With continuing reference to FIGS. 1-5 and 10, details of the pressure subsystem 50 are described, according to one embodiment. The vehicle interconnection to the reel 70 provides delivery of pressure sensor 52 readings back from the multi-sensor probe 10. The pressure sensor 52 is typically located in the front end of the multi-sensor probe 10, adjacent to the camera 32 lens. The pressure sensor 52 records and utilizes the pressure gradients that occur in the vicinity of leaks and openings throughout the pressurized pipe P to locate defects. In unpressurized pipes, low pressures typically still exist which can be measured and studied for changes that can relate to leaks. The pressure sensor 52 data will then be digitally transmitted through the cable 15 up to 40,000 times per second, along with signals from all the other sensors (camera, low voltage conductivity, and hydrophone) via long-range Ethernet or fiber optic. This 64-byte data packet is transmitted to an on-site probe signal evaluation controller 80 and PC-based processor and associated monitor so that the readings associated with the signal transmitted along the cable 15 can be viewed by an operator. The on-site PC-based processor or other equipment can also facilitate storage for archiving of the pressure sensor 52 data. The data from the pressure transducer is received and displayed in either pounds per square inch (PSI) or bar (or other units). From the on-site PC-based processor, the data can be analyzed, conditioned, archived, and otherwise beneficially used or transmitted to another data analysis tool for this same purpose. The pipe's internal pressure readings are also combined with some of the probe's other leak-detection data, particularly the low voltage conductivity data (described above) and used to help estimate the leakage rate of each defect in industry-standard ratings such as gallons per minute or liters per second.

Figure 1:
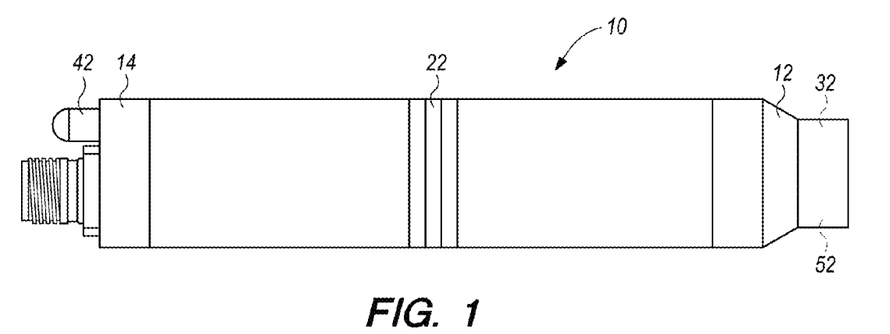
FIG. 1 is a schematic depiction of the multi-sensor probe used for underground pipe defect detection.
Figure 2:
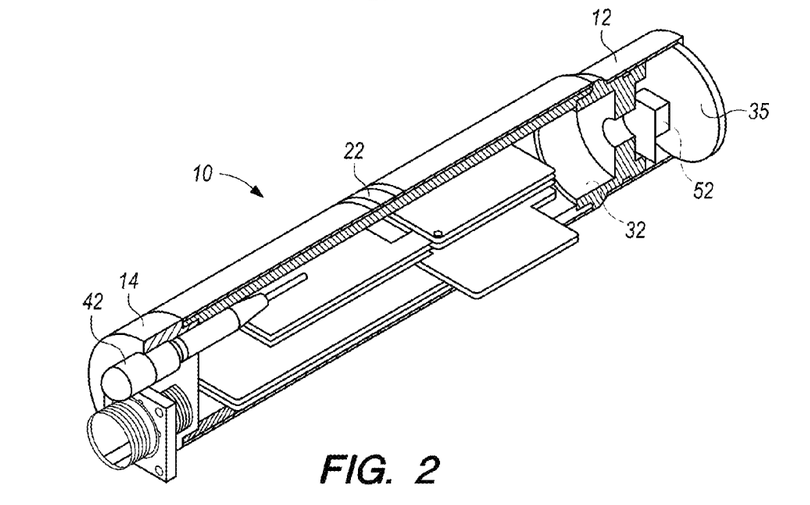
FIG. 2 is a schematic depiction of the multi-sensor probe, shown in FIG. 1, in a cutaway perspective view, where some of the inner components of the multi-sensor probe are generally depicted.
Figure 3:
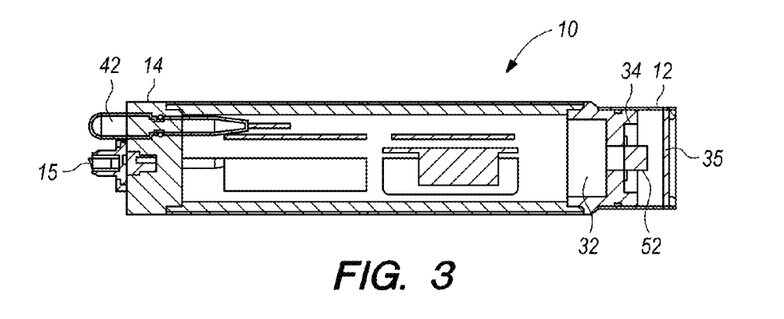
FIG. 3 is a schematic depiction of the multi-sensor probe, shown in FIG. 1 in a full-side view cut-away, where some of the inner components of the multi-sensor probe are generally depicted.
Figure 4:
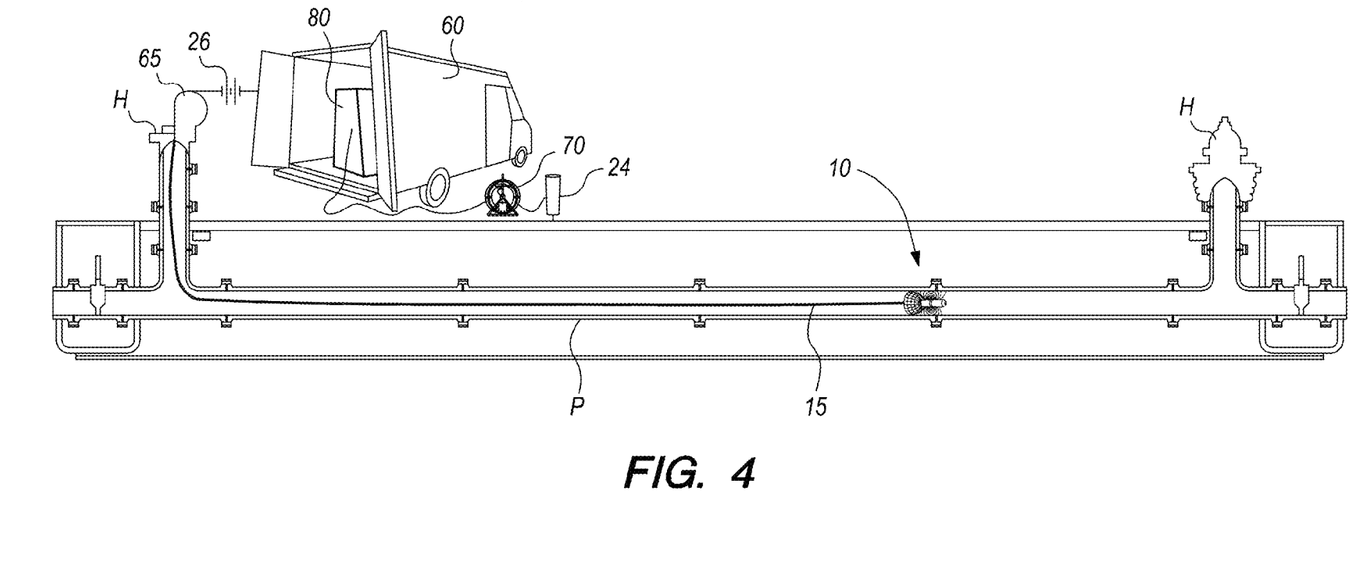
FIG. 4 is a schematic depiction of the multi-sensor probe within an underground pipe and illustrating the defect detection methodology of this invention as deployed in the field.
Figure 5:
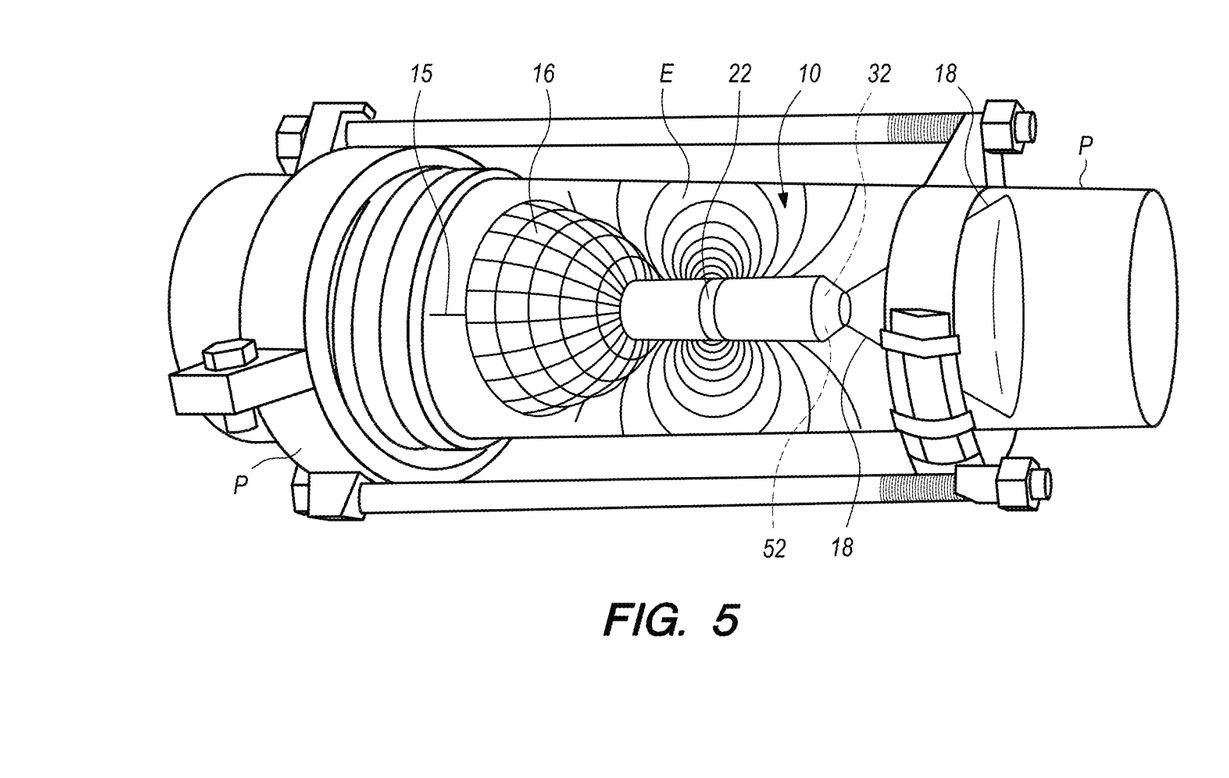
FIG. 5 is a detail view of the multi-sensor probe of FIG. 1 in a section of underground pipe and illustrating electric field lines adjacent to the electrodes of the probe.

With reference to FIG. 4, various elements of the multi-sensor pressurized pipe inspection system 1 are supported by a vehicle 60. The vehicle includes support for a cable 15 configured to provide transmission of a signal from the multi-sensor probe 10 to a vehicle 60 where other portions of the system 1 are located, for signal data collection, archiving and interpretation, among other functions. By housing all of the equipment on a mobile platform in the form of a vehicle 60, it can be driven to a site where a water line (or other pipe P) is to be inspected and operators can comfortably work in a controlled environment to gather and analyze sensor data received from the multi-sensor probe 10. Typically the vehicle 60 also provides auxiliary power for all the required facets of the system. While the vehicle 60 is typically self-propelled, such as in the form of an enclosed van, the vehicle 60 can be in the form of a trailer that is towed into position for use and positioned appropriately so that the cable 15 coming off the reel 70 can be run in the most efficient and concise way possible.

The cable 15 is preferably stored upon a spool which is preferably coupled to a winch 65 (FIGS. 4 and 6) for power control of the spool to pay off and gather up the cable 15 as required by the system 1. A distance encoder pulley 67 (or distance sensor 72) is preferably provided adjacent the cable 15 to measure an amount of cable 15 which has been payed off of or drawn back up onto the winch 65, which encoder 67, 72 acts as one form of a multi-sensor probe 10 position sensor by measuring a distance away from the vehicle 60 that the multi-sensor probe 10 has traveled, based on the amount of cable 15 which has been deployed off of the winch 65. While various figures display either a winch 65 (FIGS. 4 and 6) or a reel 70 (FIGS. 4 and 12), the system 1 can integrate features of both the reel 70 and winch 65 to provide the various functions described herein.

The cable 15 also contains elements that are important to the embodiment. The cable can provide power to the multi-sensor probe via power-over-Ethernet or via fiber optics in order to allow the sensors to operate. The cable 15 also carries all the signals back over the same CAT 6 Ethernet wires or optical fiber strands. An additional conductor within either cable type is preferably also provided as the grounding circuit for the probe's low voltage conductivity sensor. The cable 15 is not only used to provide power and communication, but also to provide a method of physical restraint and control of the probe by tethering it. As such, an internal braid of a tensile strength-creating material, such as Kevlar, preferably is utilized, to create a cable 15 that can serve as tether and withstand the tension typically found in these applications. Because the probe 10 is propelled through the pipeline utilizing the velocity, it is vital that a heavy cable 15 not be used so as to create performance-hindering weight and drag. As such, it serves the system well to utilize a cable 15 that is neutrally-buoyant. Also, as the cable 15 needs to be able to seal at the launch tube (where it enters the pipe), it is beneficial to have a smooth outer surface to create a better seal and also to reduce friction through the seal.

Figure 6:
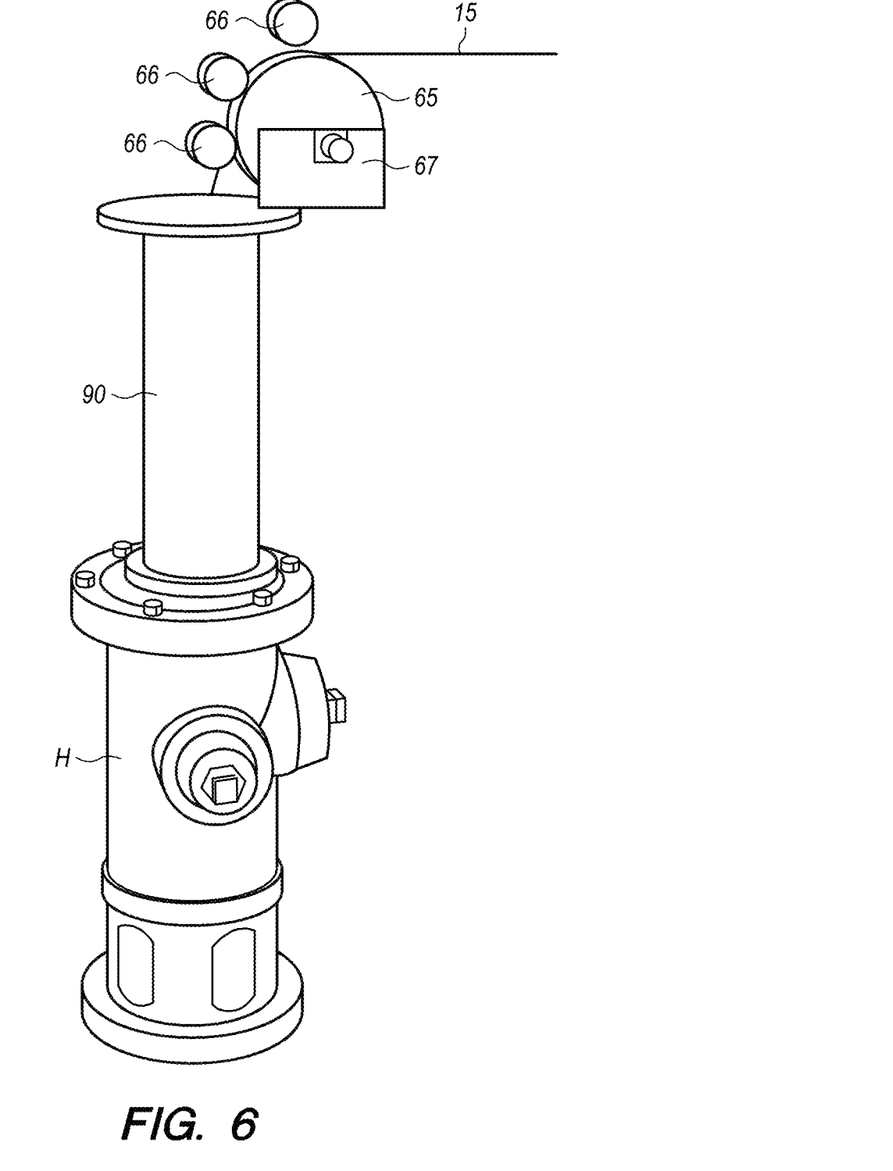
FIG. 6 is a schematic depiction of the launch tube assembly and drive motor assembly mounted atop a partially disassembled fire hydrant.

With reference to FIG. 6, after the cable 15 pays out from the winch 65 and distance encoder pulley 65, it will enter the pipe P via the launch tube assembly 90. The launch tube assembly 90 is typically constructed out of either stainless steel or aluminum and is designed to accommodate the entrance of the probe 10 and velocity chute 16 to be deployed into the pressurized (or unpressurized) pipeline, as well as accommodate the continual entrance and exit of the aforementioned communication cable 15. This assembly 90 is necessary so as to allow the pipeline to remain (highly) pressurized while the probe 10 and cable 15 enter from outside the pipe P which will be at (the typically lower) atmospheric pressure. The launch tube assembly 90 is mounted to existing valves or hydrants H or where no hydrants or valves are available or accessible, a pipe tap can be performed and the launch tube attached to that. Multiple adapters allow the launch tube 90 to be affixed to many different manufacturers' valves and hydrants H with only minor disassembly of the valves, hydrants H, or appurtenances.

Atop the launch tube 90 sits the cable drive motor winch 65 which helps force the cable 15 through the seal at the top of the launch tube 90 and into the pressurized zone of the launch tube 90. The drive motor's output shaft is attached to a drive wheel upon which the cable rides. Tension on the cable from multiple adjustable tensioner wheels 66 (pulleys) above the drive wheel of the winch 65 create the necessary friction to allow the drive wheel (pulley) to grip the cable 15 as it helps force it through the launch tube's sealing system.

In order to maintain operational flows and pressure when the pipe P is a pressurized water pipe, while continually moving the cable 15 in and out of pipe throughout the inspection, the launch tube 90 utilizes a venting and sealing arrangement wherein one side is at the same (higher) pressure as the pipe P while the other side is at the (lower) atmospheric pressure. Both sides contain a bore leading to an internal chamber, while a vent valve vents said internal chamber to the outside and seals around the cable 15 to help prevent fluid loss. The multi-sensor probe 10 and its velocity chute 16 sit within the internal chamber prior to deployment, while tethered to the cable 15. Once the launch tube 90 is attached to the hydrant H, the probe 10 and chute 16 exit the internal chamber and enter the pipe P. The cable 15 is able to pass through the bores, internal chamber, and seals in and enters and exits the pressurized pipe P, while greatly minimizing fluid loss.

The launch tube 90 is connected to the hydrant H through use of a coupling device. When the coupling is fitted, the area between the bore and internal chamber provides a pressure drop. Water can be allowed to leak at a low pressure and flow rate from a bleeder valve within the venting arrangement while the inspection is performed. This particular venting arrangement works to reduce pressure and can eliminate excess pressure on the seals of the launch tube mechanism while the cable 15 is being fed through these seals. Under certain circumstances, it can also eliminate the need for seals altogether.

Once the probe 10 is inserted into the pipe P through the launch tube 90 or other apparatus, an operator sets the "zero" or starting point once the probe 10 enters the main run of the desired pipe P to be examined. As distance data is collected associated with the cable 15 passing through the bore in the distance encoder 72, this distance data is correlated with distance away from this start point. The distance encoder 72 can include an input device where this start distance can be entered. As an alternative, the distance encoder can merely include a zeroing button which can be depressed when the probe 10 is seen to be at the start location and the cable 15 is generally taut between the location of the reel 70 assembly and the input location.

Should slack develop in the cable 15 which would cause distance data from the distance module to come out of correlation with the position of the probe 10, such potential errors can be corrected during conditioning of the data, such as at the remote processing location. One form of such conditioning involves identifying small spikes in current intensity data correlating with joints in the pipe P. When a distance between joints, valves, appurtenances, or other physical attributes in the pipe P are already known, such relatively small errors in distance data and probe location data can be corrected by causing detected sensor readings associated with physical pipe attributes to control rather than actual measured distance data from the distance module.

The winch 65 or other spool support is further interconnected to an analysis assembly so that a signal from the main cable can be transmitted to a computer or other data analysis tool with reference to ground, so that the data can be analyzed, conditioned, archived and otherwise beneficially used. Slip rings or other interconnections allow for power and data to be transmitted to the cable 15 through the winch 65 or reel 70 and to an integration terminal. This integration terminal provides one form of a signal interconnection between the end of the cable 15 opposite the free end and a multi-sensor probe 10 terminal.

The vehicle 60 interconnection to the spool of the winch 65 or reel 70 in the same manner previously stated allows for delivery of the sensors' readings back from the multi-sensor probe 10 through the cable 15. These sensors' outputs are then converted to digital data which are transmitted through the cable up to 40,000 times per second, along with signals from all the other sensors (camera, low voltage conductivity, and pressure) via long-range Ethernet. This 64-byte data packet is transmitted to an on-site probe signal evaluation controller 80 and PC-based processor and associated monitor so that the readings associated with the signal transmitted along the cable 15 can be viewed by an operator. All these readings are correlated with the readings from the previously-calibrated distance encoder 72, so that the location of readings is recorded in relation to its position along the length of the pipe P from the chosen "zero" or start point.

The on-site probe signal evaluation controller 80 and PC-based processor or other equipment read the packet of data sent from the probe 10, and process and display each sensors' respective reading separately. The on-site probe signal evaluation controller 80 and PC-based processor can also facilitate storage for archiving of the data. From the on-site PC-based processor, the data can be analyzed, conditioned, archived and otherwise beneficially used or transmitted to another data analysis tool for this same purpose. The on-site PC-based processor can be configured to interface with separate data storage equipment, such as through an internet connection, or through various forms of interconnection to a cloud computing interface to allow data received by the system to be effectively stored and utilized not only by personnel adjacent the vehicle, but also at other locations.

Initially, this data is unconditioned data. For instance, it does not take into account changes in the conductivity of the pipe material for the low voltage conductivity subsystem 20, or background noises for the acoustic subsystem 40. Also, it has not been conditioned to factor in any slack or other irregularities in playing out of the cable 15 which might cause probe 10 position data to require adjustment, such as utilizing joint position data to correct the distance portion of the signal. While this unconditioned data is less precise, there is some benefit in displaying this unconditioned data through the on-site processor. For instance, such display can verify that data is being gathered. A skilled technician might be able to tell whether the data will be useful once conditioned or if something is wrong with the operation of the system. Also, when extreme conditions exist such as an exceptionally large defect, even unconditioned data would tend to clearly show such a defect. Alarms can be preset into the user's operating PC application which would indicate to even untrained personnel a high likelihood of a serious defect and the approximate location of the defect, such that further remedial action can immediately be taken if necessary. Additionally, live, unprocessed video feed with the help of the internal gyroscope, helps the operator navigate the probe through the pipe and avoid any obstacles.

The unconditioned or raw data is initially received by the on-site PC-based processor, typically in the form of two separate transmissions from the distance module and the multi-sensor probe module which are correlated together in a single unconditioned signal. This data can be post-processed at an off-site location by utilizing internet web-based servers, accessible in the field using communication methods such as a digital cellular signal. Once this raw data has been transmitted to the processing location, the raw data can be archived in raw form. The raw data can also be conditioned, such as to normalize the current intensity data, to look for a specific acoustical frequency in a particular pipe material, or to enhance the digital video for a better image.

The data that typically requires the most post-processing is the low voltage conductivity current data. Some current intensity varying effects will tend to be constant along the entire length of pipe being examined and could obscure spikes in current intensity associated with a defect that could leak. However, without conditioning, these spikes in the data can be somewhat obscured and more difficult to identify and properly interpret.

Other conditioning can also occur, such as to eliminate static or noise from the data or to eliminate potential forms of interference from the data. The conditioned data can be archived similar to the way that the unconditioned data is archived.

The conditioned data can also be utilized with other conditioned data within a larger overall database of an overall piping network, such as an overall water system, so that a water operator or other underground pipeline operator can have a characterization of the status of the overall pipeline system, which can act as a benchmark when future testing is performed and to compare the relative health of different portions of the system to each other.

Finally, the conditioned data can be transmitted back to the vehicle 60 at the onsite location. This conditioned data can be displayed on the computer 80 or other display associated with the computer 80 so that field personnel can see the conditioned data. The conditioning process can be automated and occur quickly so that this retransmission of the conditioned data can occur in near real time. In this way, field personnel can immediately have access to conditioned data which can be viewed and provide the on-site personnel with information such as whether sections of the pipe need to be re-evaluated, or if any serious defects exist which require further inspection by other means, or to provide confidence that accurate data has been gathered before the scanning operation is wrapped up.

Figure 12:
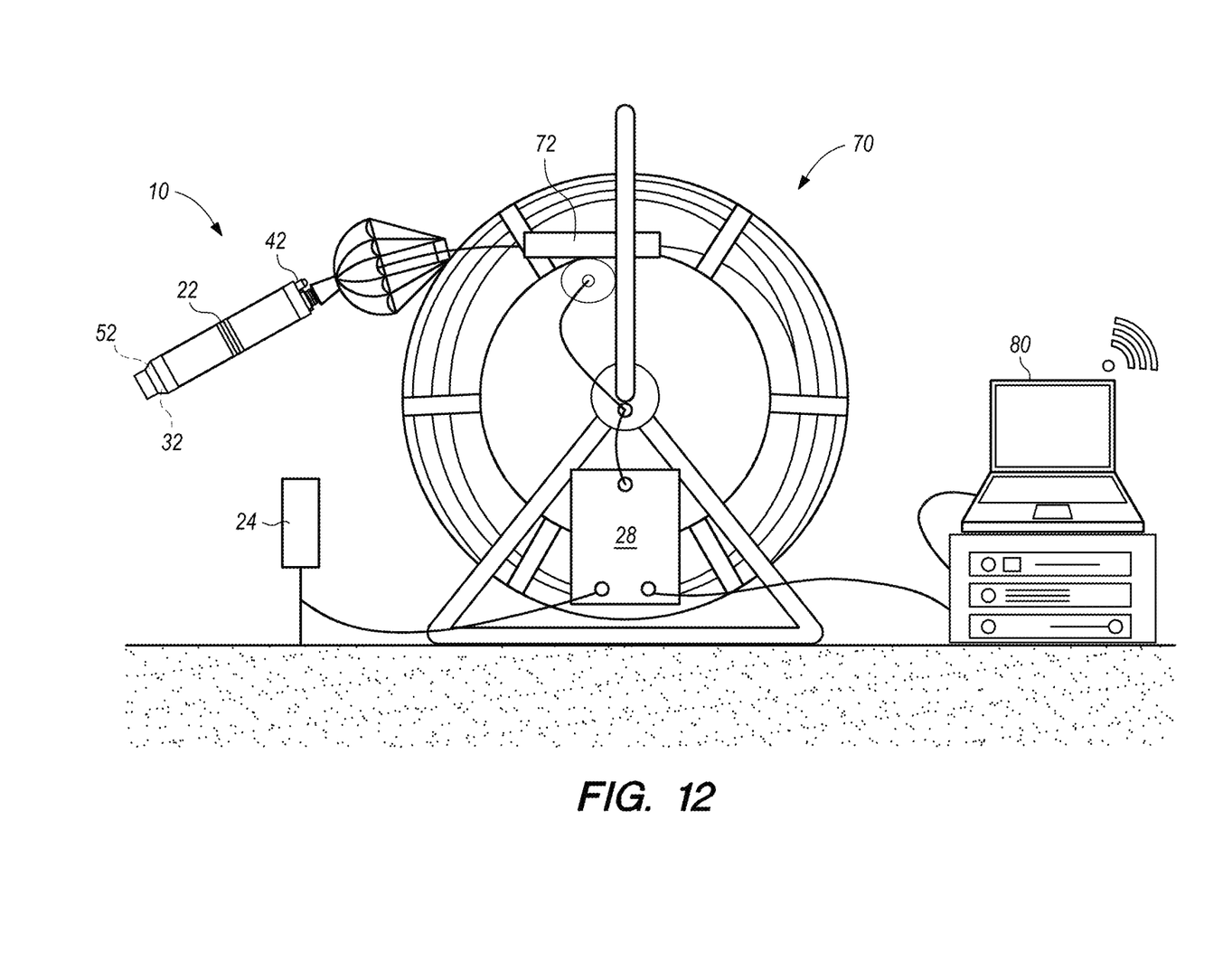
FIG. 12 is a schematic depiction of a portion of the arrangement of FIG. 4.

In FIG. 12 a detail of a portion of that which is shown in FIG. 4 is further illustrated. While in one embodiment the system of this invention is deployed from a vehicle 60, it can similarly be deployed through other mobile onsite equipment without a vehicle 60 being strictly necessary. In particular, the portable reel 70 assembly is provided which is also referred to as a spool. The portable reel 70 assembly can conveniently rest upon the ground and also include an upright member which can act as a handle when carrying the portable reel 70 assembly. A spool thereon rotates relative to the frame and supports undeployed portions of cable 15 which would typically be in the form of Ethernet or other data communication cable with the 4-in-1 probe 10 at a tip thereof. A control module on the portable reel 70 assembly interconnects the live slip ring on the spool (which maintains connection with electrically conductive pathways within the cable 15) and also provides electrical connection to the ground stake 24 and also to a control center. A distance encoder 72 is also incorporated into the portable reel 70 assembly so that data collected includes distance, and hence location of the probe 10, as well as the signal being encoded with electric resistance data, pressure data, acoustic data, camera data or any combination of the above. Alternatively, and as shown in FIGS. 4 and 6, cable 15 handling and distance encoding can be performed by or adjacent to the winch 65. In such an instance, the reel 70 can merely act to hold a ground wire leading to the ground stake 24 (FIG. 4).

This control center 80 could be installed upon the vehicle 6 as depicted in FIG. 4. As an alternative, this control center 80 could be provided on a trailer or the back of a truck or other mobile probe platform. Wireless communication from the control center 80 to a centralized location is also preferably facilitated. It is also conceivable that data would merely be transferred from the control module of the portable reel 70 assembly to a control center 80 at a separate location or directly to a central data collection facility.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for identification of underground pipe defects that leak, comprising in combination:
    a multi-sensor probe sized to fit within an underground fluid transport pipe;
    said probe including at least one electrode thereon;
    a data transmission cable having a proximal end and a distal end, said distal end electrically attached to said probe;
    a voltage source electrically coupled to said cable and spaced from said probe;
    a ground interface electrically coupled to said cable and electrically coupled to ground;
    an electric meter positioned to measure an electric signal in a circuit including said electrode, said cable, said voltage source and said ground interface, said electric signal correlating with defects in the pipe adjacent to said probe;
    wherein said probe includes a camera, said camera producing a signal transmitted along said cable and correlated with data from said electric meter; and
    wherein a distance sensor is provided along a portion of said cable outside of the pipe and measuring a length of cable going into the pipe, said distance sensor adding distance data to multi-sensor probe data to correlate said multi-sensor probe data with a position within the pipe where said probe is located.

2. The system of claim 1 wherein said voltage source includes a regulated DC power source.

3. The system of claim 2 wherein said electric meter includes a current meter adapted to measure electric current through said cable driven by a voltage produced by said regulated DC power source.

4. The system of claim 1 wherein a cable reel is provided with at least a portion of said cable located thereon, said cable reel adapted to rotate, said cable reel having said cable simultaneously electrically connected to said grounding element through said proximal end of said cable and electrically connected to said multi-sensor probe through said distal end of said cable deployed off of said reel; and
    said cable reel including a distance sensor measuring a length of cable going into the pipe in which said probe is located and to generate a signal correlating with a position of said probe, said distance sensor adding distance data to multi-sensor probe data to correlate said multi-sensor probe data with a position within the pipe where said probe is located.

5. The system of claim 4 wherein said distance sensor is mounted to a frame of said cable reel which remains fixed relative to portions of said reel which rotate and which contain portions of said electrically conductive cable thereon.

6. The system of claim 5 wherein said distance sensor is in communication with an on-site PC-based processor having a display associated therewith, said on-site PC-based processor also in communication with said electric meter and said multi-sensor probe, said processor correlating distance sensor data with data from said electric meter and said multi-sensor probe for display of sensor data versus probe position in a graph.

7. The system of claim 1 wherein said cable includes a ground wire separate from a data transmission circuit, said electrode of said probe coupled to said ground wire, and with at least one other sensor on said probe generating data and coupled to said data transmission circuit.

8. The system of claim 1 wherein said ground interface is coupled to a ground wire, said ground wire electrically coupled to said cable.

9. A system for identification of underground pipe defects that leak, comprising in combination:
    a multi-sensor probe sized to fit within an underground fluid transport pipe;
    said probe including at least one electrode thereon;
    a data transmission cable having a proximal end and a distal end, said distal end electrically attached to said probe;
    a voltage source electrically coupled to said cable and spaced from said probe;
    a ground interface electrically coupled to said cable and electrically coupled to ground;
    an electric meter positioned to measure an electric signal in a circuit including said electrode, said cable, said voltage source and said ground interface, said electric signal correlating with defects in the pipe adjacent to said probe; and
    wherein said multi-sensor probe further includes an acoustic hydrophone, a pressure sensor, and a camera.

10. The system of claim 9 wherein said camera produces a signal transmitted along said cable and correlated with data from said electric meter.

11. The system of claim 10 wherein said hydrophone produces a signal transmitted along said cable and correlated with data from said electric meter.

12. The system of claim 11 wherein said pressure sensor provides a signal transmitted along said cable and correlated with data from said electric meter.

13. A method for identification of underground pipe defects that leak, including the steps of:
    placing into an underground pipe a multi-sensor probe sized to fit within the underground pipe, the probe including at least one electrode thereon, with an electrically conductive cable having a proximal end and a distal end, the distal end electrically attached to the probe, a voltage source electrically coupled to the cable and spaced from the probe, a ground interface electrically coupled to the proximal end of the cable, and an electric meter positioned to measure an electric signal in a circuit including the cable, the voltage source and the ground interface, the electric signal correlating with defects in the pipe adjacent to the probe, the cable simultaneously electrically connected to the ground interface through the proximal end of the cable and electrically connected to the multi-sensor probe through the distal end of the cable, the multi-sensor probe including an additional data generating sensor coupled to the cable and sending data along the cable; and correlating electric meter data with data from the additional data generating sensor;

moving the multi-sensor probe through the pipe while gathering data from the electric meter and the additional data generating sensor;

measuring an amount of cable extending into the pipe;

correlating the amount of cable measured with a position of the probe within the pipe;

graphing electric meter data from the electric meter versus position data for the probe; and wherein said additional data generating sensor is a camera with images from said camera correlated with probe position data and electric meter data.

14. The method of claim 13 wherein said placing step includes the voltage source including a regulated DC power source and the electric meter including a current meter, with a series circuit existing between the electrically conductive cable, the multi-sensor probe, the voltage source and the ground interface, as well as at least a portion of ground between the ground interface and a pipe position adjacent the probe.

15. The method of claim 14 wherein said measuring step includes providing a cable distance sensor mounted to a fixed frame upon which a reel is rotatably mounted and which stores at least portions of the cable before passage into the pipe.

16. The method of claim 13 wherein the additional data generating sensor on the multi-sensor probe further includes an acoustic hydrophone, with sound intensity data gathered by the acoustic hydrophone correlated with at least probe position data.

17. The method of claim 13 wherein the additional data generating sensor further includes a pressure sensor, with pressure data gathered by the pressure sensor correlated with probe position data.

18. A method for identification of underground pipe defects that leak, including the steps of:

placing into an underground pipe a multi-sensor probe sized to fit within the underground pipe, the probe including at least one electrode thereon, with an electrically conductive cable having a proximal end and a distal end, the distal end electrically attached to the probe, a voltage source electrically coupled to the cable and spaced from the probe, a ground interface electrically coupled to the proximal end of the cable, and an electric meter positioned to measure an electric signal in a circuit including the cable, the voltage source and the ground interface, the electric signal correlating with defects in the pipe adjacent to the probe, the cable simultaneously electrically connected to the ground interface through the proximal end of the cable and electrically connected to the multi-sensor probe through the distal end of the cable, the multi-sensor probe including an additional data generating sensor coupled to the cable and sending data along the cable; and correlating electric meter data with data from the additional data generating sensor;

moving the multi-sensor probe through the pipe while gathering data from the electric meter and the additional data generating sensor;

measuring an amount of cable extending into the pipe;

correlating the amount of cable measured with a position of the probe within the pipe;

graphing electric meter data from the electric meter versus position data for the probe;

wherein said placing step includes the voltage source including a regulated DC power source and the electric meter including a current meter, with a series circuit existing between the electrically conductive cable, the multi-sensor probe, the voltage source and the ground interface, as well as at least a portion of ground between the ground interface and a pipe position adjacent the probe;

wherein said measuring step includes providing a cable distance sensor mounted to a fixed frame upon which a reel is rotatably mounted and which stores at least portions of the cable before passage into the pipe; and wherein said additional data generating sensor is a camera with images from said camera correlated with probe position data and electric meter data.

19. The method of claim 18 wherein the additional data generating sensor on the multi-sensor probe further including an acoustic hydrophone, with sound intensity data gathered by the acoustic hydrophone correlated with at least probe position data.

20. The method of claim 19 wherein the additional data generating sensor further includes a pressure sensor, with pressure data gathered by the pressure sensor correlated with probe position data.

* * * * *